(12) United States Patent
Geoffrion

(10) Patent No.: US 7,765,303 B2
(45) Date of Patent: Jul. 27, 2010

(54) METHOD AND APPARATUS FOR PROVIDING DATA OVER A DYNAMIC WIRELESS NETWORK

(75) Inventor: Jean Geoffrion, 7396 Canora, Ville Mont-Royal, Québec H3T 3J6 (CA)

(73) Assignee: Jean Geoffrion, Dorval, Quebec (CA)

( * ) Notice: Subject to any disclaimer, the term of this patent is extended or adjusted under 35 U.S.C. 154(b) by 1312 days.

(21) Appl. No.: 10/777,227

(22) Filed: Feb. 13, 2004

(65) Prior Publication Data

US 2005/0182839 A1      Aug. 18, 2005

(51) Int. Cl.
   *G06F 15/16* (2006.01)
(52) U.S. Cl. .................... 709/227; 709/242
(58) Field of Classification Search ........... 709/227, 709/242
   See application file for complete search history.

(56) References Cited

U.S. PATENT DOCUMENTS

| 6,683,865 | B1 * | 1/2004 | Garcia-Luna-Aceves et al. | 370/401 |
| 6,836,463 | B2 * | 12/2004 | Garcia-Luna-Aceves et al. | 709/241 |
| 2001/0024443 | A1 | 9/2001 | Alriksson et al. | |
| 2002/0023210 | A1 * | 2/2002 | Tuomenoksa et al. | 713/161 |
| 2002/0039357 | A1 | 4/2002 | Lipasti et al. | |
| 2002/0058504 | A1 | 5/2002 | Stanforth | |
| 2002/0141762 | A1 * | 10/2002 | Doui et al. | 399/8 |

FOREIGN PATENT DOCUMENTS

| CA | 2328655 | 9/2001 |
| EP | 1137224 A1 * | 9/2001 |

OTHER PUBLICATIONS

Scalable Routing Strategies for Ad Hoc Wireless Networks, Iwata et al, IEEE, Aug. 1999.
The Dynamic Source Routing Protocol for Mobile Ad Hoc Networks, Johnson et al, IETF, Feb. 2003.
Mobile Ad Hoc Networking and the IETF, Macker et al, Mobile Computing and Communications Review, 1998.
Comparison of Forwarding Strategies in Internet Connected MANETs, Mobile Computing and Communications Review, 2004.

* cited by examiner

Primary Examiner—Jungwon Chang
(74) Attorney, Agent, or Firm—Fasken Martineau DuMoulin LLP; Alexandre Abecassis

(57) ABSTRACT

A method for communicating from a first processing unit located on a first network to a second processing unit located on a second network, through a wireless network, comprising a plurality of nodes, wherein a plurality of routes is dynamically established between a first gateway and the second processing unit.

19 Claims, 8 Drawing Sheets

METHOD AND APPARATUS FOR PROVIDING DATA OVER A DYNAMIC WIRELESS NETWORK

CROSS-REFERENCE TO RELATED APPLICATIONS

This is the first application filed for the present invention.

TECHNICAL FIELD

This invention relates to the field of telecommunications. More precisely, this invention pertains to the field of wireless data packet telecommunications.

BACKGROUND OF THE INVENTION

Communication infrastructures are very costly and represent a large part of the investments of telcos.

In particular wired networks are very costly to implement, upgrade or replace.

In the western world, access to Wide Area Network (WAN), such as the Internet, is now very common for home users as well as for corporate users.

The trend is now to provide a larger bandwidth to the users in order to be able to share large amount of data.

High speed access to Internet is provided mainly using either a satellite link, a cable link or a xDSL link.

The skilled addressee will appreciate that the cable link and the xDSL link may be too expensive to implement in certain type of areas, such as remote areas. In such remote areas, the satellite link may be used. Unfortunately, such solution will be quite costly.

Combining a xDSL link with a radio network would be a solution to provide the access to a remote client.

Unfortunately, such solution is not very efficient for accommodating a large number of clients, as routing in the radio network will require a large amount of overhead traffic. Furthermore, processing associated with the routing will not be negligible.

The skilled addressee will appreciate that this is especially the case when the radio network is a dynamic radio network where wireless nodes are moving.

In fact, it will be further pointed out by the skilled addressee that each wireless node of the radio network will require a configuration in accordance with other wireless nodes and even in accordance with surrounding networks. Such configuration will require costly resources and maintenance.

Moreover, a further concern is the security of data transmitted in the radio network. Eavesdropping may be performed.

There is therefore a need for a method and apparatus that will overcome the above-identified drawbacks.

SUMMARY OF THE INVENTION

It is an object of the invention to provide an apparatus for communicating from a first processing unit located on a first network to a second processing unit located on a second network through a wireless network.

It is another object of the invention to provide a method for communicating from a first processing unit to a second processing unit through a dynamic wireless network.

It is another object of the invention to provide a method for communicating from a first processing unit to a second processing unit through a wireless network without reconfiguring each wireless node of the wireless network in accordance with a network comprising the first processing unit.

Yet another object of the invention is to provide a method for communicating from a first processing unit located on a first network to a second processing unit located on a second network through a wireless network.

According to a first aspect of the invention, there is provided a method for establishing a communication link from a first processing unit located in a first network to a second processing unit located in a second network, through a wireless network comprising a plurality of nodes, the method comprising in a first gateway, selecting one of a plurality of dynamic routes between the nodes to access a second gateway, the first gateway adapted for accessing the wireless network and the first processing unit, the second gateway adapted for accessing the wireless network and the second processing unit and establishing a tunnel between the first gateway and the second gateway using the selected route to thereby establish the communication link.

According to another aspect of the invention, there is provided an apparatus for transmitting data between a first processing unit located on a first network and a wireless network processing unit located on a wireless network comprising a plurality of wireless network processing units, the apparatus comprising a memory for storing a plurality of dynamically established routes between each wireless network processing unit of the plurality of wireless network processing units, a wireless module adapted to transmit a wireless signal to a given wireless network processing unit of the wireless network in accordance with one of the plurality of routes, a network adapter adapted to receive a first processing unit signal from the first processing unit and a processor connected to the memory, to the wireless module and to the network adapter, the processor adapted to encapsulate the first processing unit signal into the wireless signal to provide at least one part of the first processing unit signal to the second processing unit according to one of the routes.

According to a further aspect of the invention, there is provided, in a wireless network, a wireless network processing unit adapted for transmitting data between a first processing unit located on a first network to a second processing unit located on a second network via a first gateway and a second gateway, the first and second gateways having access to the wireless network processing unit, the wireless network processing unit comprising a wireless module receiving an encapsulated wireless signal provided by one of a neighboring wireless network processing unit and the first gateway and providing an encapsulated signal, a data providing unit providing data outside the wireless network processing unit, a memory for storing an indication of a destination for the encapsulated signal and a processing unit connected to the wireless module, to the data providing unit and to the memory, the processing unit receiving the encapsulated signal and providing at least one part of the encapsulated signal to the data providing unit according to the indication for providing the encapsulated data.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
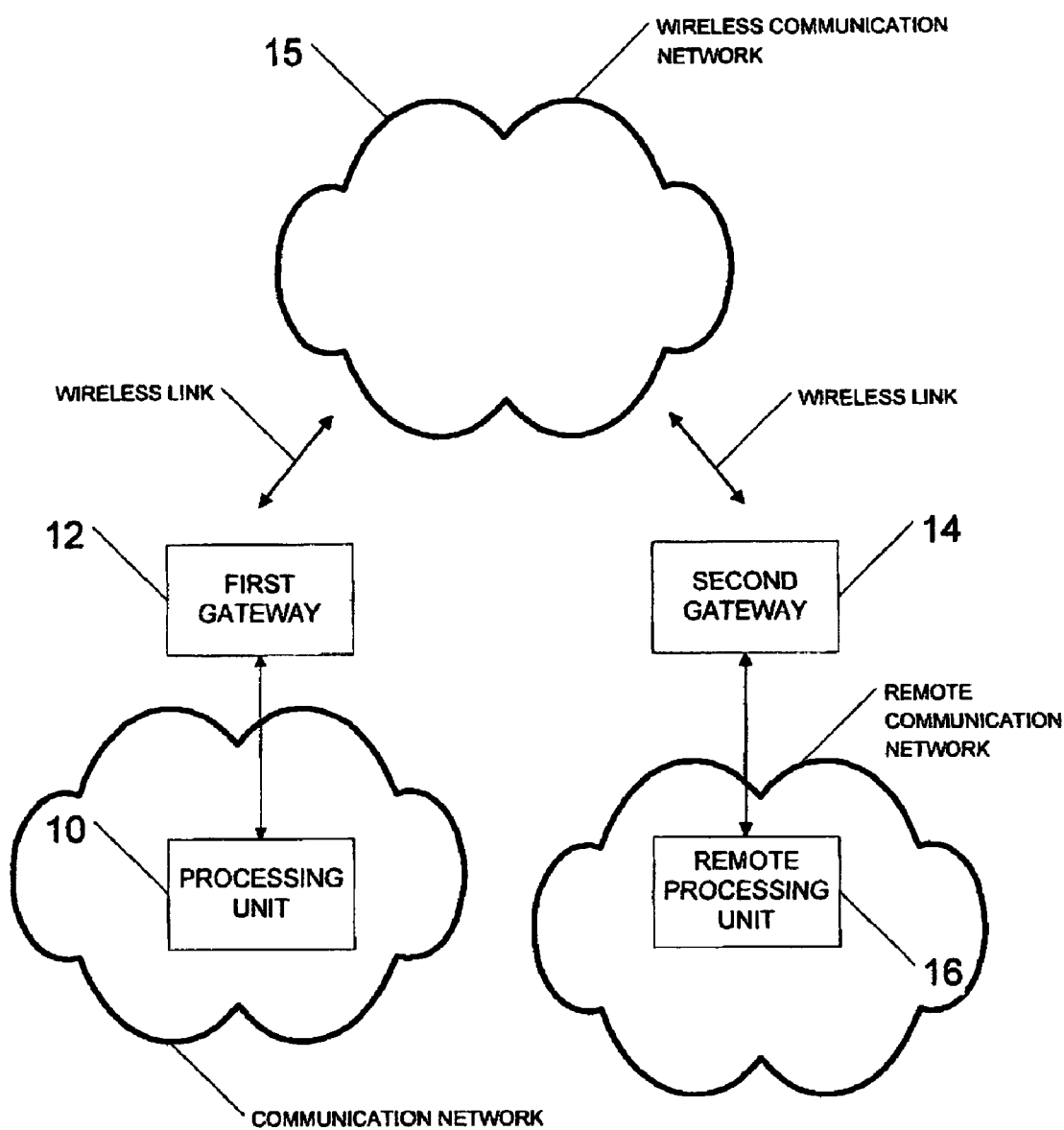
FIG. 1 is a block diagram which shows a preferred embodiment of the invention where a processing unit is communicating with a remote processing unit, through a wireless communication network, via a first gateway and a second gateway.

Now referring to FIG. 1, there is shown a block diagram which shows a preferred embodiment of the invention.

In a preferred embodiment of the invention, a processing unit 10 is communicating with a remote processing unit 16, through a wireless communication network 15, via a first gateway 12 and a second gateway 14.

Preferably, the processing unit 10 may be any device capable of communicating using a packet-switched network. For instance the processing unit 10 may be any one of a computer, a portable computer, a network computer, a personal digital assistant (PDA), or the like, having a network adapter adapted to communicate with a packet switched network such as Ethernet, Token Ring, Fiber Distributed Data Interface (FDDI), etc.

The first gateway 12 is adapted to provide a link between a network in which the processing unit 10 is located and the wireless communication network 15. The first gateway 12 provides an access to the wireless communication network 15 using a wireless link.

Figure 6:
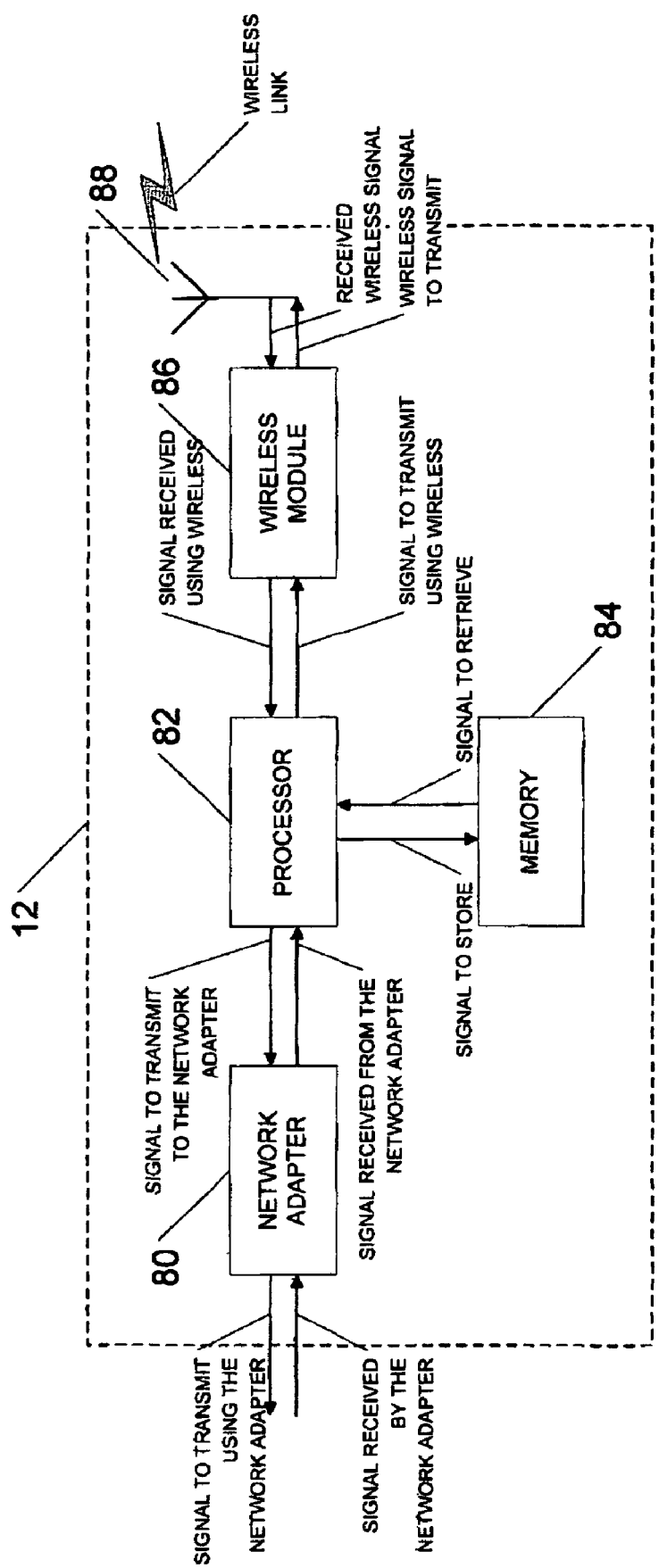
FIG. 6 is a block diagram which shows an embodiment of the first and second gateway.

Now referring to FIG. 6, there is shown an embodiment of the first gateway 12.

In this embodiment, the first gateway 12 comprises a network adapter 80, a processor 82, a memory 84, a wireless module 86 and an antenna 88.

The network adapter 80 is connected to the processor 82. For signals incoming to the first gateway 12, the network adapter 80 receives a signal from a network and provides an adapted signal to the processor 82. For signals outgoing from the first gateway 12 to the processing unit 10, the network adapter 80 receives a signal provided by the processor 82 and transmits a signal to the network to which the network adapter 80 is connected.

In a preferred embodiment, the network adapter 80 is an Ethernet 10/100 Base T network adapter.

The memory 84 is connected to the processor 82. The memory 84 stores a signal to store which is provided by the processor 82. The memory 84 further provides a signal to retrieve to the processor 82.

It will be appreciated by the skilled addressee that the memory 84 is adapted to store, inter alia, processor instructions, which, when executed, enable the first gateway 12 to share data between the processing unit 10 and a wireless node to which the first gateway 12 is connected to using the wireless link.

In a preferred embodiment, the memory 84 comprises a read only memory (ROM) and a random access memory (RAM). A minimum amount of 32 Mb is preferably needed.

The processor 84 is preferably a central processing unit which runs Linux as operating system (OS).

The processor 82 is further connected to the wireless module 86.

The wireless module 86 receives a signal for transmission over a wireless link. The wireless module 86 converts at least one part of the signal in order to provide a wireless signal to transmit to the antenna 88. Furthermore, the wireless module 86 receives a received wireless signal, which is provided by the antenna 88, and converts at least one part of the signal in order to provide a signal received using the wireless link to the processor 82.

In a preferred embodiment, the wireless module 86 is a WiFi wireless module.

The antenna 88 is connected to the wireless module 86 and is adapted to transmit and receive a wireless signal.

In a preferred embodiment, the antenna 88 is connected to the wireless module 86 using a coax cable.

It will be further appreciated by the skilled addressee that the first gateway 12 may further comprise an input/output port or interface, such as a serial port, a Universal Serial Bus (USB) port, a parallel port or the like, as well as a display device, such as a CRT device, which are not described and shown in FIG. 6 for clarity purposes.

Figure 7:
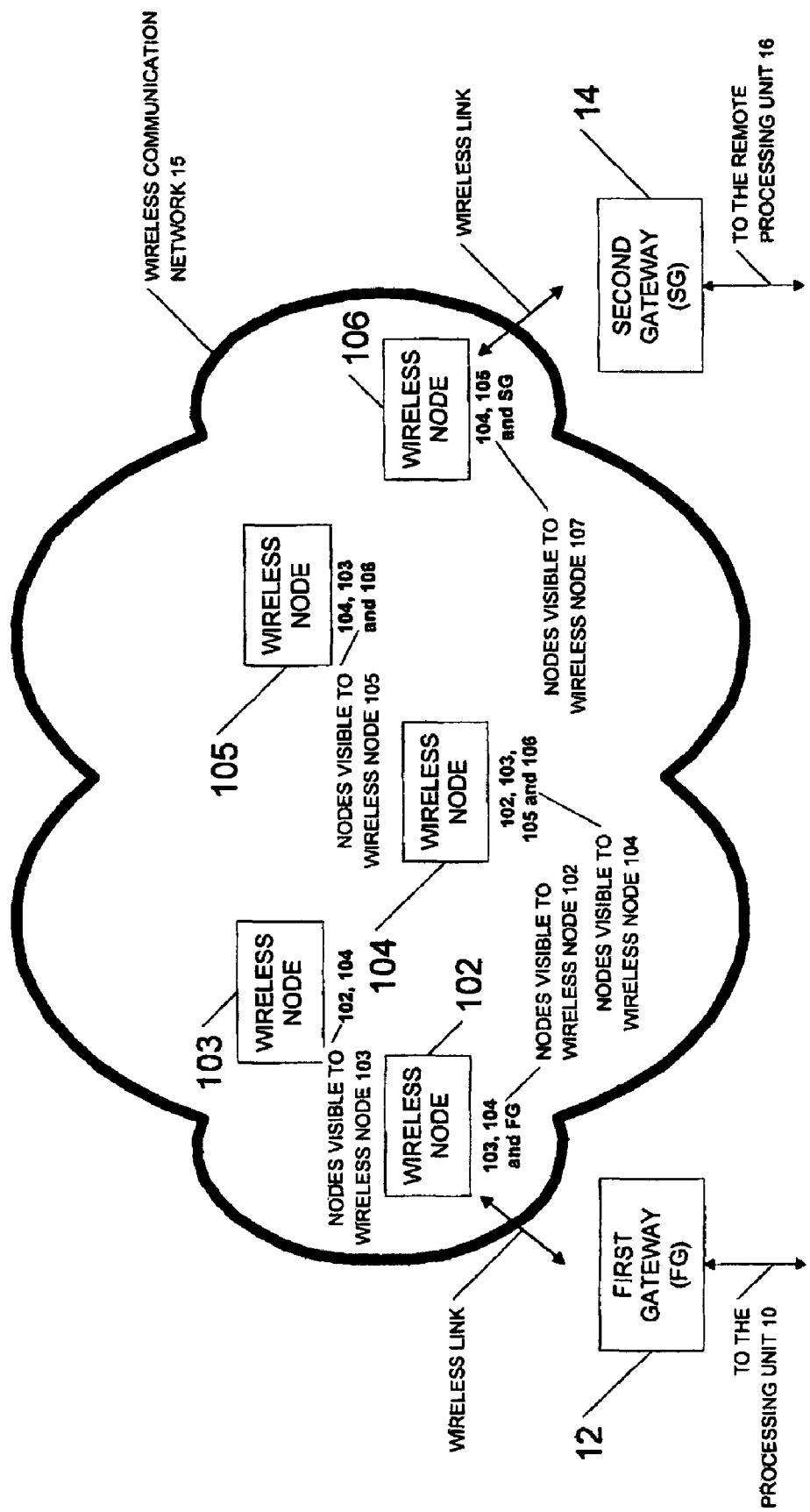
FIG. 7 is a block diagram which shows a wireless communication network comprising a plurality of wireless nodes.

Now referring back to FIG. 1, the wireless communication network 15 is a network comprising a plurality of wireless nodes, as shown in FIG. 7, each communicating using a wireless link.

Figure 8:
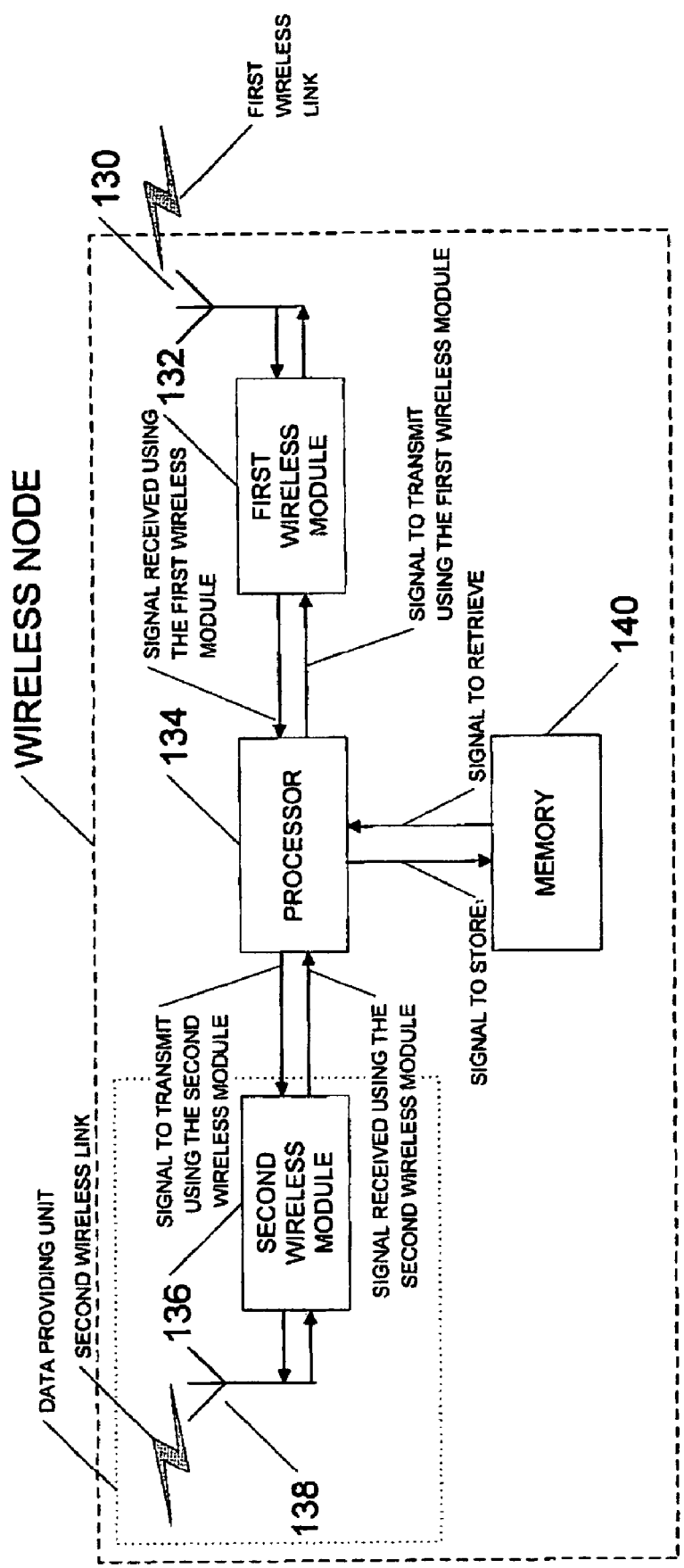
FIG. 8 is a block diagram which shows an embodiment of a wireless node.

Now referring to FIG. 8, there is shown an embodiment of a wireless node.

The wireless node comprises a processor 134, a first wireless module 132, a second wireless module 136, a first antenna 130, a second antenna 138 and a wireless node memory 140.

Each of the first wireless module 132 and the second wireless module 136 is used to transmit data to a respective given neighboring wireless node. The wireless node memory 140 is adapted to store data used for the operating of the wireless node.

Furthermore, the wireless node memory 140 comprises identification data. The identification data is intended to uniquely identify a wireless node. The identification data for a wireless node is preferably setup once during setup of the wireless node. Still in a preferred embodiment, the identification data of the wireless node is provided using an address such as X.Y.Z.W, where X, Y, Z and W are 32-bit numbers. The skilled addressee will appreciate that alternatively other types of addressing schemes may be used.

The wireless node memory 140 further comprises routing data indicative of at least one path to use for reaching a given wireless node, such routing data is referred to as a routing table comprising a plurality of gateway hosts.

It will be appreciated that in a preferred embodiment the wireless communication network is a dynamic network where wireless nodes may be added or removed randomly.

In a preferred embodiment, each wireless node of the plurality of wireless nodes communicate using a point-to-point wireless link.

Still in a preferred embodiment, the wireless communication network 15 is a WiFi communication network configured in order to operate as a Multipoint Relay (MPR) network.

Still in a preferred embodiment, the plurality of wireless nodes communicate using WiFi adapters. It will be appreciated by the skilled addressee that each of the wireless nodes acts as a repeater receiving wireless data from a first given node using a first wireless link and transmitting at least one part of the received data to a second given node using a second wireless link.

In fact, in its broadest aspect, it will be appreciated that the wireless node comprises the processor 134, the first wireless module 132, the first antenna 130, the wireless node memory 140 and a data providing unit.

While it has been disclosed that the data providing unit comprises the second wireless module 136 and the second antenna 138, it should be understood by the skilled addressee that the data providing unit may alternatively be a network adapter or a communication port adapted to provide data to a local processing unit.

The second gateway 14 is adapted to provide a link between a remote communication network where the remote processing unit 16 is located and the wireless communication network 15. The second gateway 14 provides an access to the wireless communication network 15 using a wireless link.

It will be appreciated by the skilled addressee that the second gateway 14 is similar to the first gateway 12 disclosed in FIG. 6.

The remote processing unit 16 may be any device capable of communicating in the remote communication network with the second gateway 14. For instance, the remote processing unit 16 may be any one of a computer, a portable computer, a network computer, a personal digital assistant (PDA) or the like, having a network adapter adapted to communicate with a packet-switched network such as Ethernet, Token Ring, Fiber Distributed Data Interface (FDDI) or the like.

In the preferred embodiment, the remote communication network is a Wide Area Network (WAN) such as Internet.

Now referring to FIG. 7, there is shown an example of the wireless communication network 15.

In the example shown in FIG. 7, the wireless communication network 15 comprises a wireless node 102, a wireless node 103, a wireless node 104, a wireless node 105 and a wireless node 106.

Depending on its position and configuration, each wireless node is capable of communicating with a given set of wireless nodes. In this example, the first gateway 12 is capable of communicating with the wireless node 102 using a wireless link.

The wireless node 102 is capable of communicating with the wireless node 103, the wireless node 104 and the first gateway 12 using a wireless link.

The wireless node 103 is capable of communicating with the wireless node 102 and the wireless node 104 using a wireless link.

The wireless node 104 is capable of communicating with the wireless node 102, the wireless node 103, the wireless node 105 and the wireless node 106 using a wireless link.

The wireless node 105 is capable of communicating with the wireless node 103, the wireless node 104 and the wireless node 106 using a wireless link.

Finally, the wireless node 106 is capable of communicating with the wireless node 104, the wireless node 105 and the second gateway 14 using a wireless link.

Figure 2:
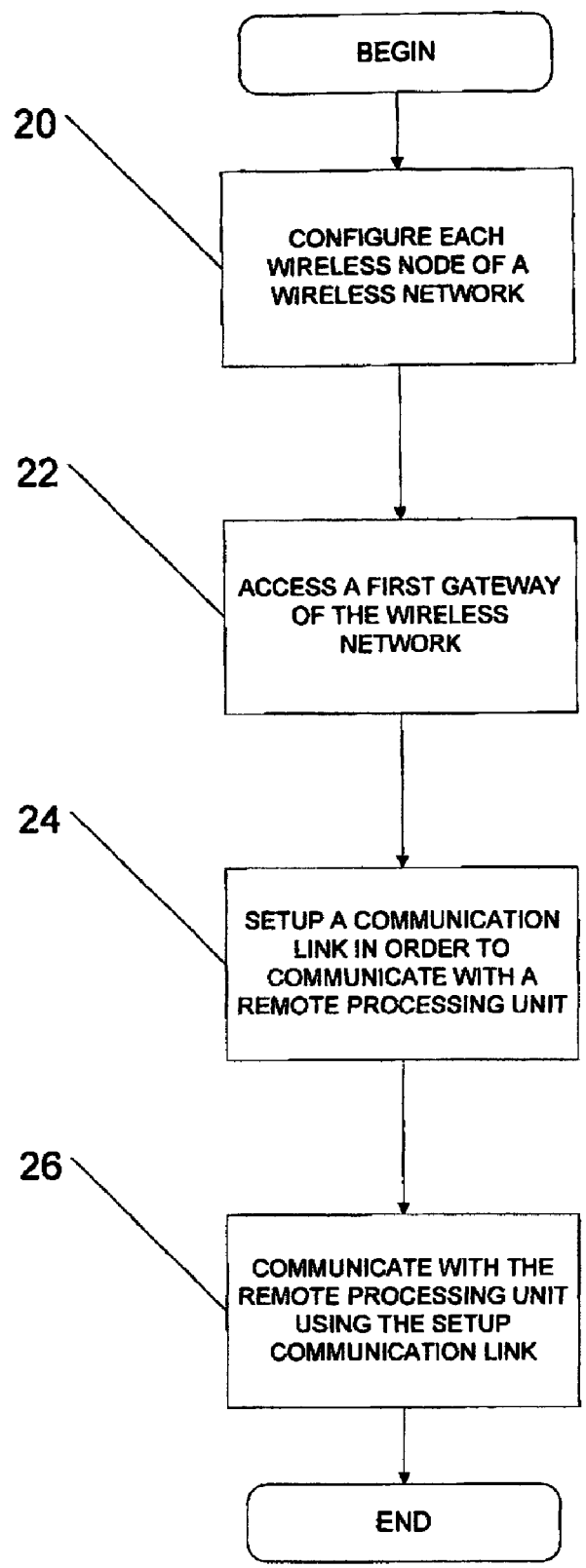
FIG. 2 is a flowchart which shows how the processing unit communicates with the remote processing unit in a preferred embodiment; each wireless node of the wireless communication network is configured, then a first gateway is accessed, a communication link is setup and the processing unit communicates with the remote processing unit.

Now referring to FIG. 2, a flowchart which shows how the processing unit 10 communicates with the remote processing unit 16 in a preferred embodiment of the invention.

Figure 3:
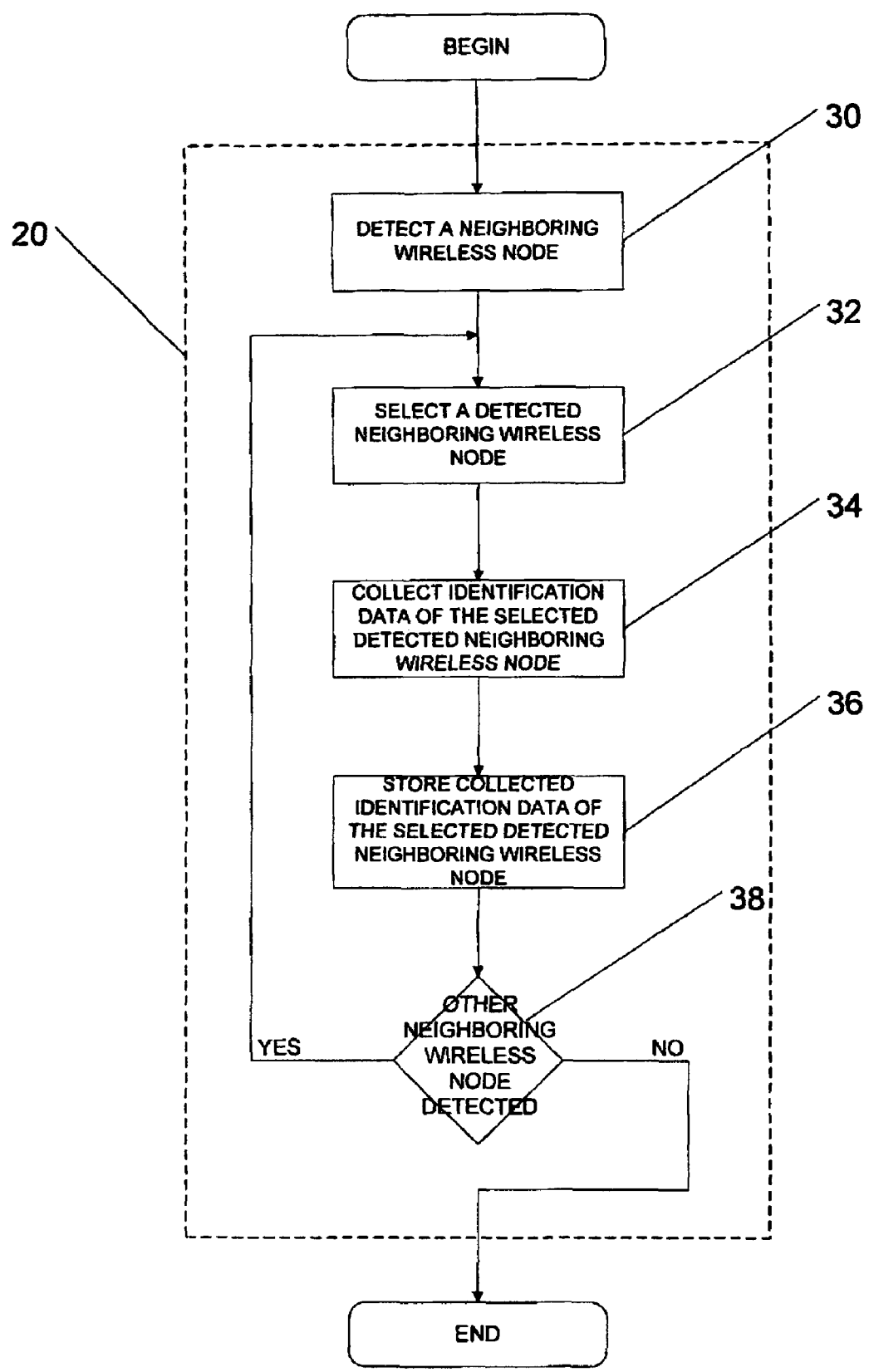
FIG. 3 is a flowchart which shows how each wireless node of the wireless communication network is configured.

According to step 20, each wireless node of the plurality of wireless nodes of the wireless communication network 15 is configured and such step is further explained in FIG. 3.

According to step 22, the first gateway 12 of the wireless communication network 15 is accessed by the processing unit 10. The first gateway 12 may be accessed using any type of network and depends on the networks supported by the first gateway 12 and the processing unit 10.

It will be appreciated that an advantageous access to the first gateway 12 by the processing unit 10 may be performed, for instance, in a Wide Area Network (WAN) using TCP/IP via an http address (i.e. connection using port 80).

Alternatively, the access to the first gateway 12 by the processing unit 10 may be performed using an IP address in the case of TCP/IP.

The skilled addressee will therefore appreciate that while it has been disclosed in FIG. 1 that the processing unit 10 is directly connected to the first gateway 12, it should be understood that, preferably and in the broadest aspect, the first gateway 12 may be accessed by the processing unit 10 via a packet-switched network.

Still referring to FIG. 2 and according to step 24, a communication link is setup in order to communicate with the remote processing unit 16. The communication link is setup between the first gateway 12 and the second gateway 14 and will be described in conjunction with FIG. 4.

Finally, according to step 26, the processing unit 10 communicates with the remote processing unit 16 using the setup communication link that was set up in step 24.

Now referring to FIG. 3, there is shown a flowchart which shows how each wireless node of the wireless communication network 15 is configured (step 20 of FIG. 2).

As explained previously, the wireless communication network 15 comprises a plurality of wireless nodes.

For a given wireless node and according to step 30, a wireless node neighboring the given wireless node is detected.

For instance, in the case where the given wireless node is the wireless node 103, shown in FIG. 7, the wireless node 102 and the wireless node 104 may be detected by the wireless node 103 and determined to be the neighboring wireless nodes.

Now referring back to FIG. 3, at step 32, one of the detected neighboring wireless nodes is selected by the given wireless node.

According to step 34, the identification data of the selected detected neighboring wireless node is collected by the given wireless node. As explained above, the identification data comprises data uniquely identifying the selected detected neighboring wireless node.

According to step 36, the identification data collected according to step 34 is stored by the given wireless node.

In a preferred embodiment, the identification data is stored in the wireless node memory 140.

According to step 38, a test is performed in order to find out if at least one other neighboring wireless node of the given wireless node is detected by the given wireless node.

In the case where at least one other neighboring wireless node of the given wireless node is detected, and according to step 32, a detected neighboring wireless node of the at least one other neighboring wireless node of the given wireless node is selected.

The loop continues until there is no other neighboring node to be detected.

Now referring to FIG. 7, in the case where the given wireless node is the wireless node 102, the detected neighboring wireless nodes are the first gateway 10, the wireless node 103 and the wireless node 104.

The neighboring wireless node of the first gateway 10 is the wireless node 102.

The neighboring wireless nodes of the wireless node 103 are the wireless node 102 and the wireless node 104.

The neighboring wireless nodes of the wireless node 104 are the wireless node 102, the wireless node 103, the wireless node 105 and the wireless node 106.

It will be appreciated that the step 20, disclosed in FIG. 3, is further performed at the given wireless node when the given wireless node connects/reconnects to the wireless communication network 15.

Alternatively, step 20 may be randomly performed in order to detect defaults and report them to neighboring wireless nodes.

Figure 4:
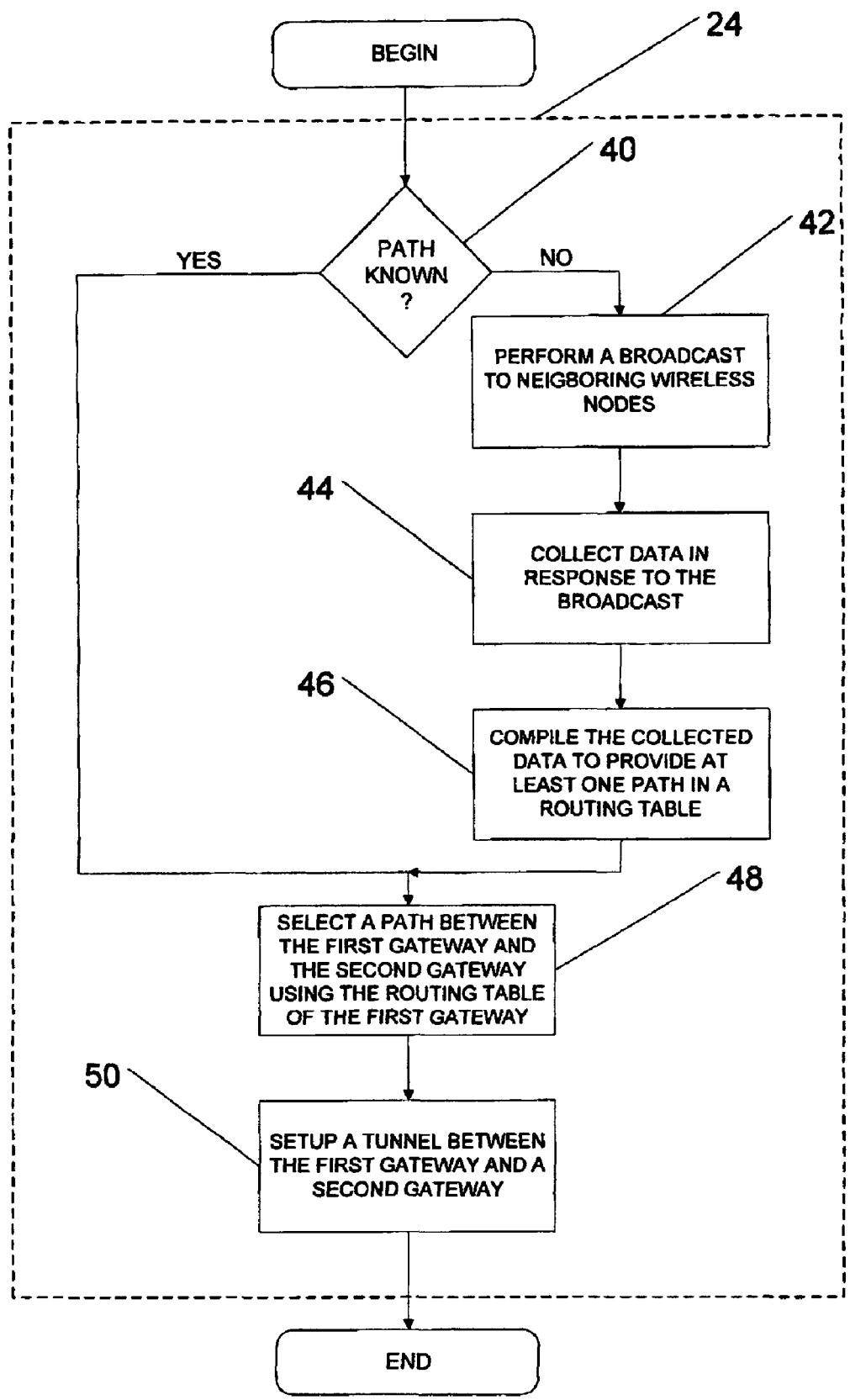
FIG. 4 is a flowchart which shows how a link is setup in the wireless communication network in order to enable communication between the first gateway and the second gateway.

Now referring to FIG. 4, there is shown a flowchart which shows how a link is setup in the wireless communication network 15 in order to enable communication between the first gateway 12 and the second gateway 14 (step 24 of FIG. 2).

According to step 40, a check is performed in order to find out if a path is known between the first gateway 12 and the second gateway 14.

In the preferred embodiment, such test is performed by checking the memory 84 to find out if such path between the first gateway 12 and the second gateway 14 exists.

In the case where there is no path between the first gateway 12 and the second gateway 14 in the memory 84 and according to step 42, a broadcast to neighboring wireless nodes is performed. The broadcast is further forwarded to each nodes of the wireless communication network 15.

The broadcast is intended to inform each wireless node that the first gateway 12 requests, for all wireless nodes, the data stored according to step 36 of FIG. 3.

The skilled addressee will appreciate that technique is of great advantage when the wireless communication network 15 is large and is dynamic as such technique avoids excessive identification data traffic and further ensures robustness as enough identification data is shared to provide an alternate path in the case where a wireless link is interrupted.

According to step 44, the data stored in each wireless node of the communication network 15 is forwarded to the first gateway 12.

According to step 46, the data forwarded to the first gateway 12 according to step 44 is compiled and at least one path between the first gateway 12 and the second gateway 14 is generated and stored in a routing table comprised in the memory 84. Preferably only pertinent data is stored in the memory 84.

Now referring to step 48, a path between the first gateway 12 and the second gateway 14 is selected using the routing table of the first gateway 12.

It will be appreciated that the path may be selected using at least one of various principles, known by the ones skilled in the art, such as network load, operating cost of a wireless link, availability of a wireless link, etc.

According to step 50, a tunnel is created between the first gateway 12 and the second gateway 14. The tunnel is created upon request of the processing unit 10.

In a preferred embodiment of the invention, the tunnel created is an encrypted tunnel which is a virtual private network (VPN). While it has been contemplated that create a non-encrypted tunnel is sufficient for practicing the invention, creating an encrypted tunnel is of great advantage for avoiding eavesdropping.

The skilled addressee will appreciate that the virtual private network (VPN) enables a crossing of the wireless communication network 15 without having to modify a data packet as the data packet is encapsulated in a wireless data packet which is transmitted throughout the wireless communication network 15.

Figure 5:
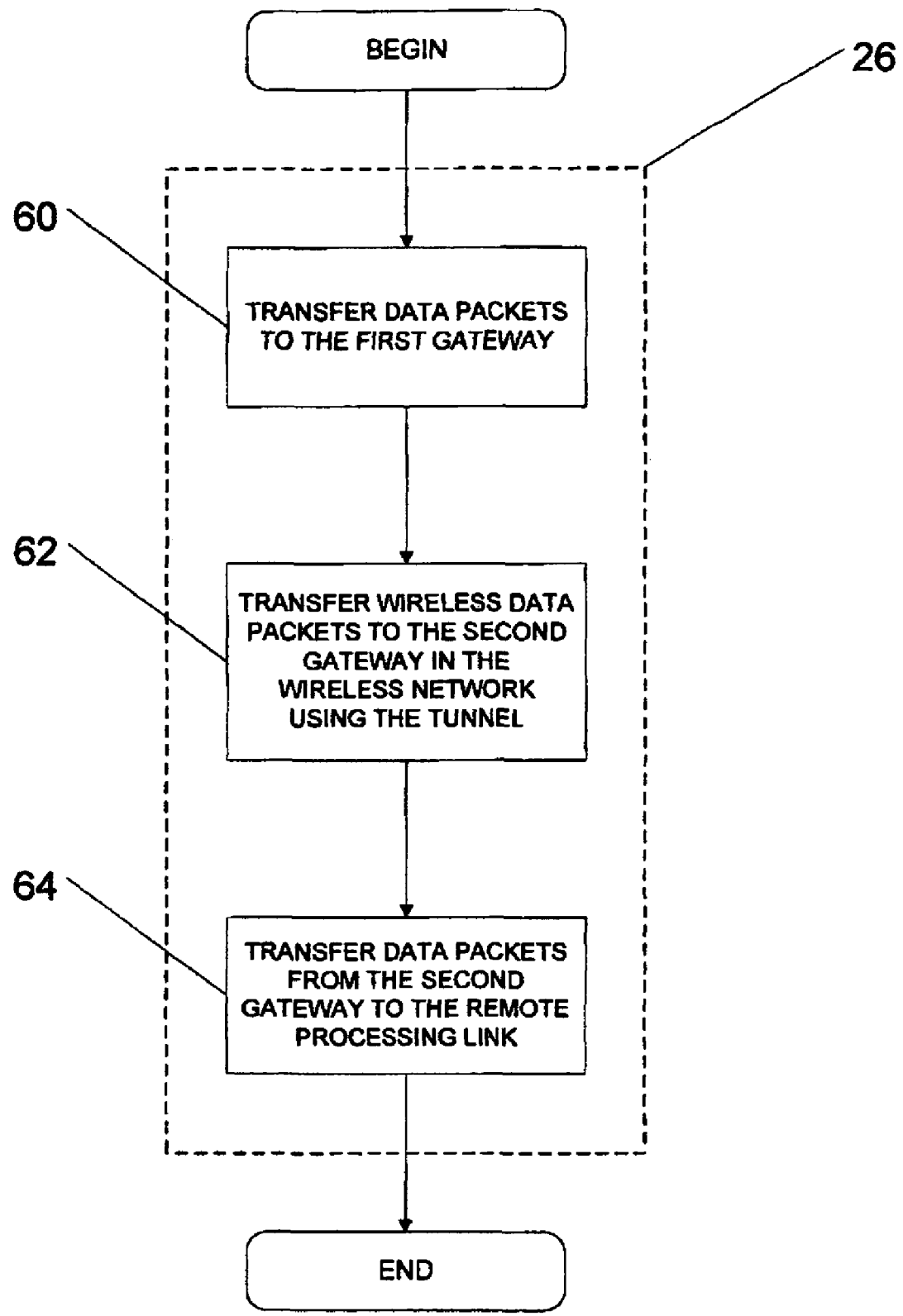
FIG. 5 is a flowchart which shows how the processing unit communicates with the remote processing unit.

Now referring to FIG. 5, there is shown a flowchart which shows how the processing unit 12 communicates with the remote processing unit 14 (step 26 of FIG. 2).

According to step 60, data packets are provided by the processing unit 10 to the first gateway 12.

According to step 62, data packets received by the first gateway 12 are encapsulated and transferred to the second gateway 14 through the wireless communication network 15 using the tunnel that was set up at step 50.

According to step 64, the data packets received by the second gateway 14 and extracted from the wireless data packets are provided to the remote processing unit 16.

The skilled addressee will appreciate that such embodiment is of great advantage when the wireless communication network 15 is a dynamic wireless communication network.

It will be further appreciated that the method disclosed above is of great advantage for many applications.

For instance, the method disclosed above may be used to provide high speed access to a Wide Area Network (WAN), such as Internet, to a user in a remote area. The remote area may be one of the group consisting of suburbs, restricted access areas, inappropriate areas and areas subject to a disaster.

In such case, the remote processing unit 16 is the computer of the user to which the high speed access has to be delivered.

The wireless communication network 15 may be a WiFi-based network or any other suitable type of wireless communication network 15 depending on the properties of the remote area where the high speed access has to be delivered. The skilled addressee will accordingly be able to select a preferred one.

Alternatively, the wireless communication network 15 may be a dynamic wireless communication network and may be composed of mobile wireless nodes.

For instance, the wireless communication network 15 may comprise mobile wireless nodes such as Taxi, Bus, or any mobile transportation apparatus. In this case, the remote processing unit 16 and the second gateway 14 are located inside the same mobile transportation apparatus. Preferably an high speed Internet is provided.

Alternatively, such access to a Wide Area Network may be used to deliver private information data such as interactive publicity to a plurality of remote processing units 14 each of which is a screen or the like.

The embodiments of the invention described above are intended to be exemplary only. The scope of the invention is therefore intended to be limited solely by the scope of the appended claims.

I claim:

1. A method for establishing a communication link from a first processing unit located in a first network to a second processing unit located in a second network, through a wireless dynamic network comprising a plurality of nodes, said method comprising:

generating a plurality of dynamic routes using each of said plurality of nodes;

in a first gateway, selecting one of the plurality of dynamic routes between the nodes to access a second gateway, the first gateway adapted for accessing the wireless network and said first processing unit, the second gateway adapted for accessing the wireless network and said second processing unit; and establishing a tunnel between the first gateway and the second gateway using the selected route to thereby establish said communication link through said wireless dynamic network without configuring each node of the wireless network in accordance with the first network; wherein said generating comprises, for a given node, detecting a neighboring node to said given node, collecting data identifying said detected neighboring node and transmitting to the first gateway said data identifying said detected neighboring node with data identifying said given node to generate said plurality of dynamic routes without, for each of said nodes, knowledge of remaining distant nodes of the plurality of nodes of the network.

2. The method as claimed in claim 1, wherein said generating is performed in response to a broadcast performed by said first gateway.

3. The method as claimed in claim 1, wherein said generating of said plurality of dynamic routes is performed randomly in time.

4. The method as claimed in claim 1, further comprising performing a broadcast from said first gateway, wherein said generating is performed in response to said broadcast.

5. The method as claimed in claim 1, wherein said generating comprises detecting a first set of neighboring nodes to said given node and detecting a second set of neighboring nodes to each neighboring node of said first set of neighboring nodes.

6. The method as claimed in claim 1, further comprising selecting at least one part of said transmitted data identifying said detected neighboring node using said data identifying said given node according to a criteria.

7. The method as claimed in claim 6, wherein said criteria comprises at least one of bandwidth, reliability of each of said nodes and cost of using each of said nodes.

8. The method as claimed in claim 1, wherein said selecting of one of the routes in the first gateway is performed according to a criteria.

9. The method as claimed in claim 8, wherein said criteria comprises at least one of bandwidth, reliability of each of said nodes and cost of using each of said nodes.

10. The method as claimed in claim 1, wherein said establishing a tunnel comprises establishing an encrypted tunnel.

11. The method as claimed in claim 1, wherein said first network comprises one of a wide area network (WAN) and a local area network (LAN).

12. The method as claimed in claim 11, wherein said first network comprises the Internet.

13. The method as claimed in claim 1, wherein said data identifying said detected neighboring node and said data identifying said given node comprise IP address identification data.

14. An apparatus for transmitting data between a first processing unit located on a first network and a wireless second network processing unit located on a wireless network comprising a plurality of wireless network processing units, said apparatus comprising:

a memory for storing a plurality of dynamically established routes between each wireless network processing unit of said plurality of wireless network processing units;

a wireless module adapted to transmit a wireless signal to a given wireless network processing unit of the wireless network in accordance with one of said plurality of routes;

a network adapter adapted to receive a first processing unit signal from said first processing unit; and a processor connected to said memory, to said wireless module and to said network adapter, said processor adapted to encapsulate said first processing unit signal into said wireless signal to provide at least one part of said first processing unit signal to said second processing unit according to one of said routes; wherein said plurality of dynamically established routes between each wireless network processing unit have been generated using a generating process comprising, for a given wireless network processing unit, detecting a neighboring wireless network processing unit to said given wireless network processing unit, collecting data identifying said detected neighboring wireless network processing unit and receiving said data identifying said detected neighboring wireless network processing unit with data identifying said given wireless network processing unit to generate said plurality of dynamic routes, without, for each of said wireless network processing unit, knowledge of remaining distant wireless network processing units of the plurality of wireless network processing units.

15. The apparatus as claimed in claim 14, wherein said wireless module comprises a point to point wireless communication module.

16. The apparatus as claimed in claim 14, wherein said processor is further adapted to encrypt said first processing unit signal to provide an encrypted first processing unit signal which is further encapsulated into said wireless signal to provide said first processing unit signal to said second processing unit.

17. The apparatus as claimed in claim 14, wherein said memory comprises a volatile memory comprising said plurality of dynamically established routes between each wireless network processing unit of said plurality of wireless network processing units.

18. The apparatus as claimed in claim 14, wherein said network adapter comprises an Ethernet compatible network adapter.

19. The apparatus as claimed in claim 14, wherein said data identifying said detected neighboring wireless network processing unit and said data identifying said given wireless network processing unit comprise IP address identification data.

* * * * *